US009560028B1

(12) United States Patent
Salehpour et al.

(10) Patent No.: US 9,560,028 B1
(45) Date of Patent: Jan. 31, 2017

(54) SYSTEMS AND METHODS FOR FILTERING INTERPROCESS COMMUNICATIONS

(71) Applicant: Symantec Corporation, Mountain View, CA (US)

(72) Inventors: Jonathon Salehpour, Upland, CA (US); Brian T Witten, Hermosa Beach, CA (US)

(73) Assignee: Symantec Corporation, Mountain View, CA (US)

( * ) Notice: Subject to any disclaimer, the term of this patent is extended or adjusted under 35 U.S.C. 154(b) by 107 days.

(21) Appl. No.: 14/451,037

(22) Filed: Aug. 4, 2014

(51) Int. Cl.
*G06F 7/04* (2006.01)
*H04L 29/06* (2006.01)

(52) U.S. Cl.
CPC .................................... *H04L 63/08* (2013.01)

(58) Field of Classification Search
CPC ...... H04L 63/08; G06F 21/53; G06F 21/6281; G06F 21/52
See application file for complete search history.

(56) References Cited

U.S. PATENT DOCUMENTS

| 2004/0199763 | A1* | 10/2004 | Freund | G06F 21/53 713/154 |
| 2008/0126800 | A1* | 5/2008 | Guo | G06F 21/57 713/167 |
| 2009/0044201 | A1* | 2/2009 | Lee | G06F 9/542 719/318 |
| 2010/0121927 | A1* | 5/2010 | Zhang | G06F 9/54 709/206 |
| 2012/0255014 | A1* | 10/2012 | Sallam | G06F 21/564 726/24 |
| 2012/0291138 | A1* | 11/2012 | Haga | G06F 21/51 726/27 |
| 2013/0179991 | A1* | 7/2013 | White | G06F 21/53 726/29 |
| 2013/0312058 | A1* | 11/2013 | Thompson | G06F 21/54 726/1 |
| 2014/0059357 | A1* | 2/2014 | Andersson | G06F 21/602 713/189 |
| 2014/0137184 | A1* | 5/2014 | Russello | G06F 21/60 726/1 |

(Continued)

OTHER PUBLICATIONS

Bruce McCorkendale, et al.; Systems and Methods for Authenticating an Application; U.S. Appl. No. 14/181,410, filed Feb. 14, 2014.

(Continued)

*Primary Examiner* — Techane Gergiso
(74) *Attorney, Agent, or Firm* — Fisherbroyles LLP

(57) ABSTRACT

The disclosed computer-implemented method for filtering interprocess communications may include (1) identifying a service process that provides a service on the computing device, (2) authenticating the service process, (3) identifying a request by a client process to use the service provided by the service process, (4) authenticating the client process, (5) receiving an interprocess communication from the client process directed toward the service process, (6) determining that the interprocess communication is malicious, and (7) in response to determining that the interprocess communication is malicious, blocking the interprocess communication from being communicated to the service process. Various other methods, systems, and computer-readable media are also disclosed.

20 Claims, 6 Drawing Sheets

(56) References Cited

U.S. PATENT DOCUMENTS

2014/0157355 A1* 6/2014 Clancy, III .............. G06F 21/53 726/1
2016/0026813 A1* 1/2016 Neitzel .............. G06F 21/6218 726/17

OTHER PUBLICATIONS

"StackTraceElement", http://developer.android.com/reference/java/lang/StackTraceElement.html, as accessed Jul. 30, 2014, (Mar. 2, 2009).

"<intent-filter>", http://developer.android.com/guide/topics/manifest/intent-filter-element.html, as accessed Jun. 8, 2014, (Feb. 13, 2009).

"ClipboardManager", http://developer.android.com/reference/android/text/ClipboardManager.html, as accessed Jun. 8, 2014, (Feb. 18, 2009).

"SAFE Samsung for Enterprise", http://www.samsung.com/us/business/samsung-for-enterprise/, as accessed Jun. 8, 2014, (Dec. 26, 2012).

"Samsung KNOX", http://www.samsung.com/global/business/mobile/platform/mobile-platform/knox/, as accessed Jun. 8, 2014, (Mar. 14, 2014).

Jonathon Salehpour; Systems and Methods for Authorizing Attempts to Access Shared Libraries; U.S. Appl. No. 14/486,323, filed Sep. 15, 2014.

"Android Binder", http://elinux.org/Android_Binder, as accessed Jun. 8, 2014, (Jun. 20, 2011).

"Class StackTraceElement", http://docs.oracle.com/javase/7/docs/api/java/lang/StackTraceElement.html, as accessed Jul. 30, 2014, Oracle, (1993).

"Trail: The Reflection API", http://docs.oracle.com/javase/tutorial/reflect/, as accessed Jul. 30, 2014, The Java™ Tutorials, Oracle, (1995).

"Obtaining Method Type Information", http://docs.oracle.com/javase/tutorial/reflect/member/methodType.html, as accessed Jul. 30, 2014, The Java™ Tutorials, Oracle, (1995).

"Call Stacks and Program Execution", http://docs.oracle.com/cd/E24457_01/html/E21994/afamv.html, as accessed Jul. 30, 2014, Oracle Solaris Studio 12.3: Performance Analyzer, Oracle Solaris Studio 12.3 Information Library, Oracle, (2009).

"Symantec Insight", http://www.symantec.com/reputation-based-security, as accessed Jul. 30, 2014, Symantec Corporation, (1995).

"Lesson: Members", http://docs.oracle.com/javase/tutorial/reflect/member/index.html, as accessed Jul. 30, 2014, The Java™ Tutorials, Oracle, (1995).

"Class Method", http://docs.oracle.com/javase/8/docs/api/java/lang/reflect/Method.html, as accessed Jul. 30, 2014, Oracle, (1993).

"Class StackTraceElement", http://docs.oracle.com/javase/7/docs/api/java/lang/StackTraceElement.html#StackTraceElement%28java.lang.String,%20java.lang.String,%20java.lang.String,%20int%29, as accessed Jul. 30, 2014, Oracle, (1993).

"Call stack", http://en.wikipedia.org/wiki/Call_stack, as accessed Jul. 30, 2014, Wikipedia, (Dec. 15, 2005).

"Process (computing)", http://en.wikipedia.org/wiki/Process_(computing), as accessed Jul. 30, 2014, Wikipedia, (Apr. 23, 2004).

"Call Stack", http://www.techopedia.com/definition/25586/call-stack-c, as accessed Jul. 30, 2014, Techopedia, (2010).

* cited by examiner

SYSTEMS AND METHODS FOR FILTERING INTERPROCESS COMMUNICATIONS

BACKGROUND

The rapid move from the dominant personal computing model to the widespread use of mobile computing has led to a proliferation of operating environments—combinations of processor types, operating systems, and hardware features. Due to the need to minimize memory usage and maximize battery life, these operating environments necessarily face strict limitations on the size of the operating system, and therefore features that may be included in the operating system. One of the neglected areas of many of these operating systems is the security of interprocess communications.

Software programs installed on a computing device may provide a service that may be used by other software programs. The operating system executing on the device may also provide services. Typically, when an application is installed, the user is presented with a list of services requested by the application, and the user is asked to grant permission for the application to use the enumerated services. Subsequently, either the client application or the service-providing application may use data in unsecure or malicious ways, whether by design of the software developer or under control of a malware infection. Applications may use the interprocess communication system provided by the device's operating system to transmit sensitive data from the device and/or to perform other malicious activities. Accordingly, the instant disclosure identifies and addresses a need for additional and improved systems and methods for filtering interprocess communications.

SUMMARY

As will be described in greater detail below, the instant disclosure describes various systems and methods for filtering interprocess communications by authenticating service and client processes, intercepting interprocess communications, and filtering the interprocess communications based on the context and/or content of the interprocess communications.

In one example, a computer-implemented method for filtering interprocess communications may include (1) identifying a service process that provides a service on the computing device, (2) authenticating the service process, (3) identifying a request by a client process to use the service provided by the service process, (4) authenticating the client process, (5) receiving an interprocess communication from the client process directed toward the service process, (6) determining that the interprocess communication is malicious, and (7) in response to determining that the interprocess communication is malicious, blocking the interprocess communication from being communicated to the service process.

In some examples, receiving the interprocess communication from the client process may include intercepting the interprocess communication from an interprocess communication service of an operating system executing on the computing device. In some examples, blocking the interprocess communication from being communicated to the service process may include preventing the interprocess communication from using the interprocess communication service of the operating system executing on the computing device.

In some examples, authenticating the service process may include authenticating a digital signature included in an assertion file associated with the service process. In some examples, authenticating the service process may further include identifying at least one service provided by the service process by inspecting the assertion file, and determining that the interprocess communication is malicious may include determining that the interprocess communication is not associated with the service provided by the service process. In some examples, authenticating the client process may include authenticating a digital signature included in an assertion file associated with the client process. In some examples, authenticating the client process may further include identifying one or more services used by the client process by inspecting the assertion file, and determining that the interprocess communication is malicious may include determining that the interprocess communication is not associated with the service identified by the client process.

In some examples, the computer-implemented method may further include authenticating a policy controller that evaluates interprocess communications for maliciousness. In such example, determining that the interprocess communication is malicious may include submitting content of the interprocess communication and/or context of the interprocess communication to the policy controller and receiving from the policy controller an indication that the interprocess communication is malicious. In some examples, determining that the interprocess communication is malicious may include submitting the interprocess communication to the policy controller and receiving, from the policy controller, an indication that the interprocess communication is malicious.

In some examples, determining that the interprocess communication is malicious may include obtaining, by querying a reputation database using information identifying the client process file, a reputation for the client process, and/or obtaining, by querying a reputation database using information identifying the service process file, a reputation for the service process. In such examples, determining that the interprocess communication is malicious may include determining that the reputation of the client process and/or the reputation of the service process is negative.

In one embodiment, a system for implementing the above-described method may include several modules stored in memory, such as (1) a service authentication module that identifies a service process that provides a service on the computing device and authenticates the service process, (2) an client authentication module that identifies a request by a client process to use the service provided by the service process and authenticates the client process, (3) a communication module that receives an interprocess communication from the client process directed toward the service process, (4) a policy control module that determines that the interprocess communication is malicious and, in response to determining that the interprocess communication is malicious, blocks the interprocess communication from being communicated to the service process. The system may also include one or more physical processors configured to execute the service authentication module, the client authentication module, the communication module, and the policy control module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a service process that provides a service on the computing device, (2) authenticate the service process, (3) identify a request by a client process to use the service provided by the service process, (4) authenticate the client process, (5) receive an interprocess communication from the client process directed toward the service process, (6) determine that the interprocess communication is malicious, and (7) in response to determining that the interprocess communication is malicious, block the interprocess communication from being communicated to the service process.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
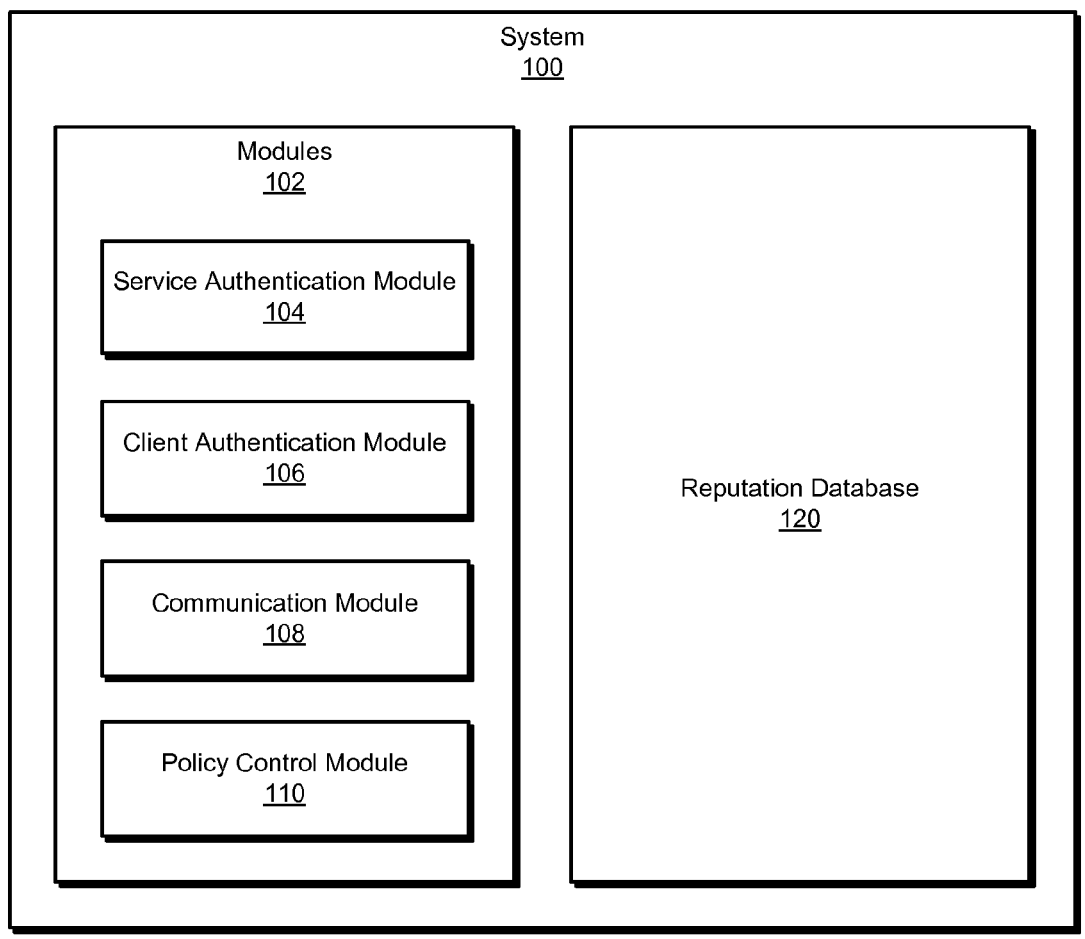
FIG. 1 is a block diagram of an exemplary system for filtering interprocess communications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for filtering interprocess communications. As will be explained in greater detail below, systems and methods described herein may authenticate service and client processes and may filter communications between the processes. When a client process attempts to communicate with a service provider, systems and methods described herein may intercept the interprocess communication and determine whether the communication includes is malicious based on content of the communication and/or context derived from authenticating the client and service processes.

The systems and methods described herein may provide various features and advantages over traditional interprocess communication technologies. For example, some systems may rely on identification information that can be spoofed when determining whether to allow or deny communications between processes. In contrast, the systems and methods described herein may use assertions and/or other authentication tools to authenticate processes before determining whether to allow the processes to communicate.

As another example, while traditional solutions may rely on static permissions to allow or deny interprocess communications, the systems described herein may provide a dynamic architecture for adding and modifying assertions in client and service software packages. Such assertions may then be used to validate client and service processes and to determine whether the context of an inter-process communication attempt should be allowed.

Furthermore, traditional systems may use an all-or-nothing approach that allows or prevents all interprocess communications between certain client and service processes. This approach may be particularly problematic in situations where a trustworthy application is approved to use a particular service and is later compromised by malware that uses the service for malicious purposes (traditional systems may not allow permissions to be revoked or changed in such situations and/or may not provide a mechanism for dynamically changing permissions). In contrast, and as described in greater detail below, the systems and methods described herein may handle interprocess communications on a case-by-case basis, taking the context and/or content of each interprocess communication into account when determining whether to allow or deny interprocess communications.

Figure 2:
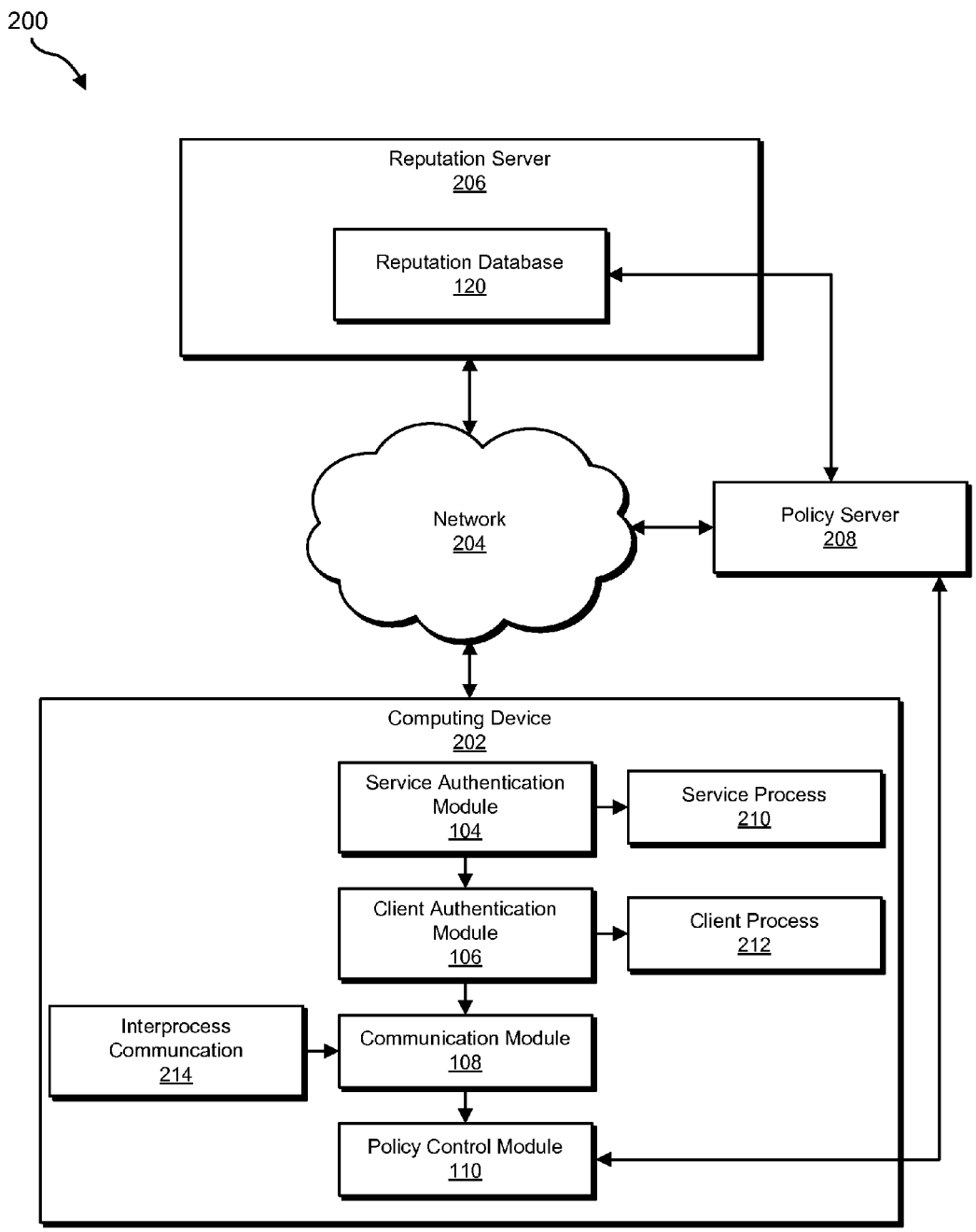
FIG. 2 is a block diagram of an additional exemplary system for filtering interprocess communications.

The following will provide, with reference to FIGS. 1-2, detailed descriptions of exemplary systems for filtering interprocess communications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for filtering interprocess communications. As illustrated in this figure, exemplary system 100 may include one or more modules 102 for performing one or more tasks. For example, and as will be explained in greater detail below, exemplary system 100 may include a service authentication module 104 that may identify a service process that provides a service on a computing device. Service authentication module 104 may also authenticate the service process. Exemplary system 100 may also include a client authentication module 106 that may identify a request by a client process to use the service provided by the service process and authenticate the client process. Exemplary system 100 may also include a communication module 108 that may receive an interprocess communication from the client process directed toward the service process. Exemplary system 100 may additionally include a policy control module 110 that may determine that the interprocess communication may be malicious and in response to determining that the interprocess communication is malicious, block the interprocess communication from being communicated to the service process. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, server 206, and/or policy server 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as reputation database 120. In one example, reputation database 120 may be configured to store data that indicates the trustworthiness of various objects or entities, such as software program or software publishers. Reputation data may be quantified as a reputation score that may be calculated on the basis of several factors, such as the prevalence of a software program, the reputation of the software program's publisher or developer, a community rating, and/or an evaluation by a trusted entity.

Reputation database 120 may represent portions of a single database or computing device or a plurality of databases or computing devices. For example, reputation database 120 may represent a portion of server 206 in FIG. 2, computing system 510 in FIG. 5, and/or portions of exemplary network architecture 600 in FIG. 6. Alternatively, reputation database 120 in FIG. 1 may represent one or more physically separate devices capable of being accessed by a computing device, such as reputation server 206 or policy server 208 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a reputation server 206 via a network 204. In one example, computing device 202 may be programmed with one or more of modules 102 and/or may store all or a portion of the data in reputation database 120. Additionally or alternatively, server 206 or policy server 208 may be programmed with one or more of modules 102 and/or may store all or a portion of the data in reputation database 120.

In one embodiment, one or more of modules 102 from FIG. 1 may, when executed by at least one processor of computing device 202, server 206, and/or policy controller 208, enable computing device 202, server 206, and/or policy controller 208 to filter interprocess communications. For example, and as will be described in greater detail below, service authentication module 104 may identify a service process 210 that provides a service on computing device 202 and authenticate service process 210. Client authentication module 106 may identify a request by client process 212 to use the service provided by service process 210. Client authentication module 106 may authenticate client process 212. Communication module 108 may receive interprocess communication 214 from client process 212 directed toward service process 210. Policy control module 110 may determine that interprocess communication 214 is malicious, and in response to determining that interprocess communication 214 is malicious, block interprocess communication 214 from being communicated to service process 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 and policy controller 208 generally represent any type or form of computing device that is capable of storing, comparing, and/or providing data. Examples of server 206 and policy controller 208 include, without limitation, application servers and database servers configured to provide various database services and/or run certain software applications. In some examples, and as illustrated in FIG. 2, server 206 and policy controller 208 may represent separate and discrete computing devices. In other examples, however, server 206 and policy controller 208 may represent portions of a single computing device, such as a device operated and maintained by a security software publisher.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202, server 206, and policy controller 208.

Figure 3:
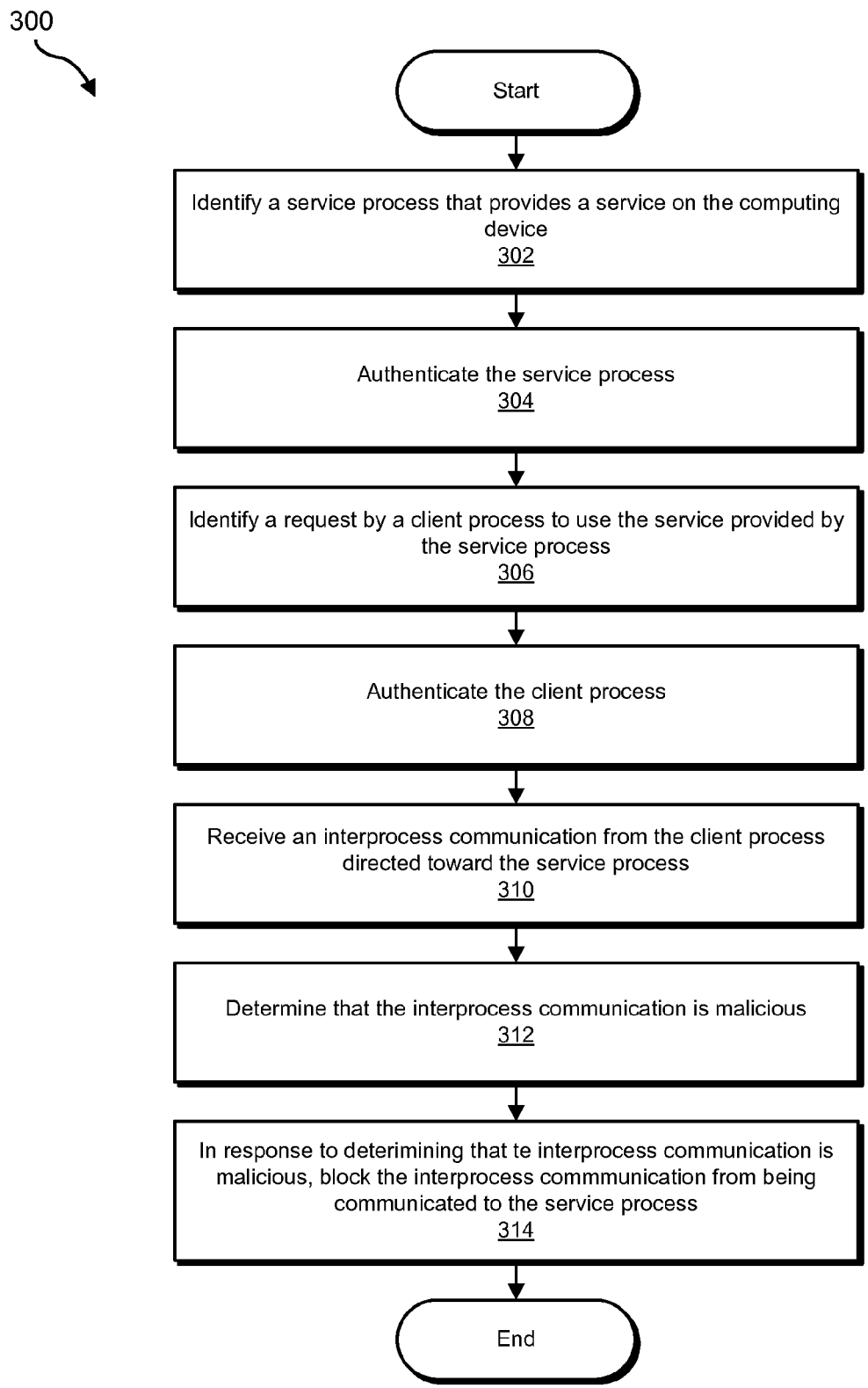
FIG. 3 is a flow diagram of an exemplary method for filtering interprocess communications.

FIG. 3 is a flow diagram of an exemplary computer-implemented method 300 for filtering interprocess communications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a service process that provides a service on a computing device. For example, at step 302 service authentication module 104 may, as part of computing device 202 in FIG. 2, identify service process 210 that provides a service on computing device 202.

Service authentication module 104 may identify a service process in a variety of ways. For example, service authentication module 104 may identify service processes that are already running on the computing device or may identify service processes as they load and/or begin executing on the computing device. As another example, service authentication module 104 may identify a service as the service attempts to authenticate (i.e., a service may attempt to register itself via a bootstrapping mechanism when it loads). Alternatively or additionally, service authentication module 104 may identify services requested for use by client processes. If the operating system running on the computing device includes a service registry that arbitrates permissions between client processes and service processes, service authentication module 104 may intercept requests by service processes to register services available for use by client processes and/or may intercept requests by client processes to use the provided services.

The phrase "service process," as used herein, generally refers to a program that performs functions at the request of other programs (referred to as "clients") running on a computing device. Service processes may run in a low-priority or background mode on a device and may have no user interface. Service processes may provide an interface for client programs to use hardware features of the computing device, such as a camera or global positioning system (GPS) receiver. Service processes may also provide an interface to services provided by the operating system running on the computing device, such as an email or text messaging service. Service processes may also provide services beyond those provided by the operating system. In some examples, service processes may act as clients to other service processes. For example, a stock ticker service process may use web services provided by a web service process.

At step 304 one or more of the systems described herein may authenticate the service process. For example, at step 304 service authentication module 104 may, as part of computing device 202 in FIG. 2, authenticate service process 210 to provide a service to client processes running on a computing device 202. As used herein, the term "authenticate" generally refers to any technique for confirming the identity and/or nature of a process. Authenticating a process may involve determining that the process in fact is what the entity purports to be. Authenticating a process may also involve determining the purpose, objective, or function of the entity, to verify that the process is not malicious. For example, service authentication module 104 may authenticate a process by validating a file (e.g., an assertion file or signature file that indicates an identity and/or purpose of a software package and corresponding processes) included and/or embedded in a software package underlying the process. Authenticating a service process may involve obtaining information about the services provided by the service process from an assertion file or elsewhere.

Service authentication module 104 may authenticate the service process in a variety of ways. For example, service authentication module 105 may authenticate the service process using public key infrastructure (PKI) by reading an assertion file and validating the assertion file (e.g., by authenticating a digital signature included in a digital certificate in an assertion file associated with the process). A public key for authenticating the service process may be included in the digital certificate or obtained from a certificate authority.

In some examples, service authentication module 104 may authenticate the service process further by inspecting an assertion file, manifest file, and/or any other file to identify at least one service provided by the service process. In another example, service authentication module 104 may identify application programming interfaces (APIs) the service process provides for use by client processes and may infer that that the service process provides one or more services based on the APIs associated with the service process. Service authentication module 104 may also authenticate the service process by using any other procedure or technology suitable for confirming the identity and/or nature of the service process.

At step 306 one or more of the systems described herein may identify a request by a client process to use the service provided by the service process. For example, at step 306 client authentication module 106 may, as part of computing device 202 in FIG. 2, identify a request by client process 212 to use a service provided by service process 210.

The phrase "client process," as used herein, generally refers to programs that use the services provided by service processes. To extend the example given in the description of service processes above, a client process may be a stock ticker application that displays the current price of a selected set of stocks. The stock ticker client application may obtain current stock prices from a stock ticker service process, which in turn may use services from a web service process to obtain stock prices from a website.

Client authentication module 106 may identify a request by a client process to use a service provided by a service process in a variety of ways. For example, client authentication module 106 may identify client processes as they are installed on a computing device. Additionally or alternatively, client authentication module 106 may identify client processes as they begin executing on the computing device. Client authentication module 106 may also identify client processes as they request to use services provided by service processes (e.g., a client may communicate with client authentication module 106 via a bootstrapping mechanism and may specify a service that the client would like to communicate with). As with service processes, if the operating system running on the computing device includes a system service that arbitrates permissions between client processes and service processes, client authentication module 106 may operate in place of the system service by receiving or intercepting requests by client processes to use services provided by service processes.

At step 308 one or more of the systems described herein may authenticate the client process. For example, at step 308 client authentication module 106 may, as part of computing device 202 in FIG. 2, authenticate client process 212.

Client authentication module 106 may authenticate the client process in a variety of ways. For example, as described above for authenticating a service process, client authentication module 106 may authenticate the client process using PKI to authenticate a digital signature included in an assertion file associated with the client process. A public key for authenticating the client process may be included in a digital certificate in the assertion file or may be obtained from a certificate authority.

In some examples, client authentication module 106 may further authenticate the client process by identifying at least one service used by the client process by inspecting the client process file. With a client process intended to run on the ANDROID operating system, the program file includes a manifest that lists the services requested for use by the client process. For example, a client application may request permission to use a camera or the messaging service provided by the device operating system. In another example, client authentication module 106 may identify APIs the client process calls in the operating system or in service processes.

Client authentication module 106 may authenticate the client process at various times. For example, client authentication module 106 may authenticate the client process when the client process application file is installed on the computing device or when the client process attempts to communicate with a service process. Client authentication module 106 may also perform authentication in phases. For example, when the client process application file is installed on the computing device, client authentication module 106 may use a digital certificate in the file to verify that the file came from the software provider indicated in the digital certificate and that the file has not been altered since it was created. When the client process subsequently attempts to use services provided by a service process, client authentication module 106 may validate an assertion file associated with the client process to verify that the client process has permission to use the requested service. Client authentication module 106 may also authenticate the client process by using any other procedure or technology suitable for confirming the identity and/or nature of processes.

At step 310 one or more of the systems described herein may receive an interprocess communication from the client process directed toward the service process. For example, at step 310 communication module 108 may, as part of computing device 202 in FIG. 2, receive interprocess communication 214 from client process 212, directed toward service process 210, running on computing device 202.

Communication module 108 may receive an interprocess communication from the client process in a variety of ways. For example, communication module 108 may receive the interprocess communication from the client process by intercepting the interprocess communication from an interprocess communication service of an operating system executing on the computing device. In some examples, communication module 108 may filter interprocess communications before passing communications verified to be non-malicious to the interprocess communication service of the operating system. In other examples, communication module 108 may provide interprocess communication services by passing filtered communications from client processes to the service processes to which the communications are directed. In some examples, communication module 108 may verify that the client process has been granted permission to use the services provided by the client process. In other examples, communication module 108 may rely on the permission service provided by the operating system running on the computing device to verify permissions.

Interprocess communications may be transported by a variety of mechanisms, such as sockets, pipes, or shared memory. In one example, the ANDROID operating system may use a shared memory mechanism called a binder for interprocess communication, and binders may be allocated and used for interprocess communications discussed herein.

At step 312 one or more of the systems described herein may determine that the interprocess communication is malicious. For example, at step 312 policy control module 110 may, as part of computing device 202 in FIG. 2, determine that interprocess communication 214 received from client process 212 and directed toward service process 210 is malicious.

Policy control module 110 may determine that the interprocess communication is malicious in any suitable manner. In one example, policy control module 110 may examine the contents of the interprocess communication to determine whether the interprocess communication includes sensitive information. In one example, policy control module 110 may examine the context of the interprocess communication to determine whether the interprocess communication is being sent or received in a malicious context. As used herein, the term "context" refers to information identifying the operating environment of the client process and/or the service process. Context information may include a process ID, an application ID, and/or a reputation for the client process and/or service process. Policy control 110 may use the context of a process to determine whether the process is transmitting (or is a process that could be suspected of transmitting) malicious interprocess communications. Additionally or alternatively, policy control module 110 may determine whether the contexts of a client and the context of a service process match (e.g., whether an interprocess communication would be expected or ordinary within the contexts of the client and service processes). If the contexts of the client and service do not match, policy control module 110 may determine that an interprocess communication sent within the contexts is malicious.

Policy control module 110 may also determine whether the service process to which the interprocess communication is directed provides a service that transmits the interprocess communication from the computing device. Policy control module 110 may also examine the contents and/or context of the interprocess communication for other malicious communications (e.g., malware). For example, various forms of malware may use interprocess communications and may also propagate from one device to another over various communication interfaces available on a computing device.

In one example, policy control module 110 may examine the contents and/or context of all interprocess communications 214 that communication module 108 receives from client processes 212. In another example, policy control module 110 may direct some or all interprocess communications 214 to one or more policy controllers 208 to be examined for malicious content and/or context. Policy controller 208 may be designed to examine interprocess communications of a specific type. For example, policy controller 208 may be designed to examine data communicated in cut/copy/paste operations where data is transferred from one application to another. Policy controller 208 may be located on computing device 202 or on a remote device. Policy controller 208 may be a module within client process 212 or service process 210. Including policy controller 208 as a module within client process 212 or service process 210 may provide an execution time advantage by eliminating the need for a context switch when the integrated policy controller 208 examines the content and/or context of an interprocess communication 214.

In another example, systems and methods described herein may include authenticating a policy controller 208 that evaluates interprocess communications 214 for maliciousness, where determining that the interprocess communication 214 is malicious includes submitting the interprocess communication 214 to the policy controller 208, and receiving from the policy controller an indication of whether the interprocess communication is malicious. In one example, policy controller 208 may be provided by the developer of either service process 210 or client process 212. Policy controller 208 may thereby be designed with knowledge of the structure and intended contents of interprocess communications between client process 212 and service process 210. In another example, a trusted third party, such as a security software developer, may provide policy controller 208.

In some examples, policy control module 110 and/or policy server 208 may determine that interprocess communication 214 is malicious by querying reputation database 120 to obtain a reputation for client process 212, using information that identifies the client process file. In some examples, policy control module and/or policy server 208 may determine that interprocess communication 214 is malicious by querying reputation database 120 to obtain a reputation for service process 210, using information that identifies the service process file. In these examples, policy control module 110 and/or policy server 208 may determine that interprocess communication 214 is malicious by determining that the reputation of client process 212 and/or the reputation of service process 210 is negative.

Reputation database 120 may be compiled in a variety of ways. For example, reputation database may include data obtained by surveying a set of client devices within one or more organizations and/or among clients using security software agents provided by a security software developer. Reputation data may include data related to software programs and/or files, such as prevalence data, historic data, publisher reliability data, and/or malware incident data.

At step 314 one or more of the systems described herein may, in response to determining that the interprocess communication is malicious, block the interprocess communication from being communicated to the service process. For example, at step 314 policy control module 110 may, as part of computing device 202 in FIG. 2, block interprocess communication 214 from being communicated to service process 210 after determining that interprocess communication 214 is malicious.

Policy control module 110 may block the interprocess communication from being communicated to the service process in a variety of ways. In some examples, policy control module 110 may block the interprocess communication from being communicated to the service process by preventing the interprocess communication from using the interprocess communication service of the operating system executing on the computing device. In another example, services and methods described herein may provide interprocess communications on the computing device and may block the interprocess communication from being communicated to the service process by not transmitting the interprocess communication from the client process to the service process.

Figure 4:
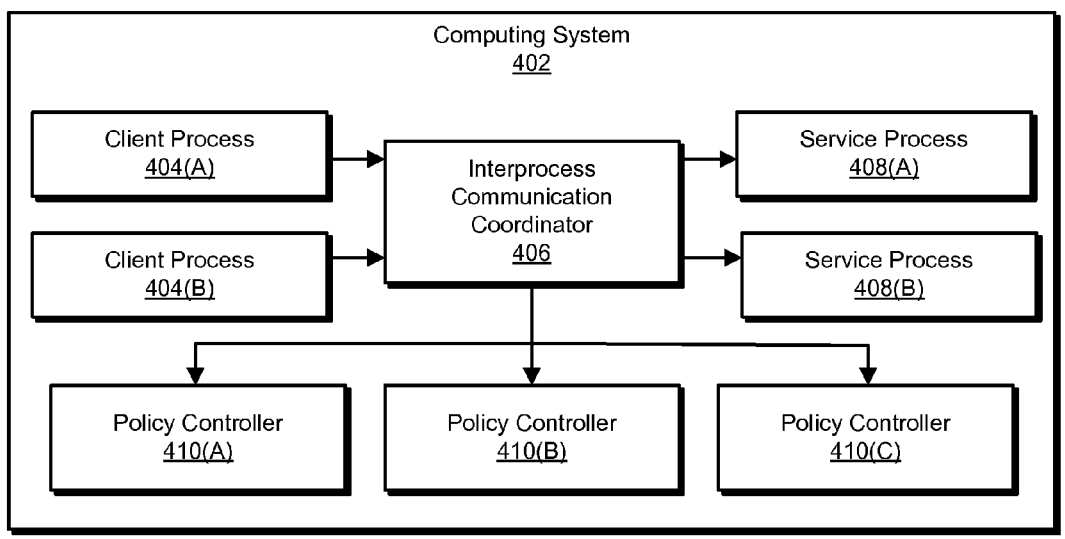
FIG. 4 is a block diagram of an additional exemplary system for filtering interprocess communications.

FIG. 4 is a block diagram of an additional exemplary system 400 for filtering interprocess communications. As illustrated in this figure, exemplary system 400 may include computing system 402. Computing system 402 may also include any of modules 102 from FIG. 1. Computing system 402 may also include client processes 404(A) and 404(B), an interprocess communication coordinator 406, service processes 408(A) and 408(B), and policy controllers 410(A), 410(B), and 410(C).

In one embodiment, interprocess communication coordinator 406 may implement the functions of service authentication module 104, client authentication module 106, communication module 108, and/or policy control module 110. In this embodiment, communication coordinator 406 may authenticate client processes 404 and service processes 408, identify services provided by service processes 408, and may identify the services requested for use by client processes 404. Communication coordinator 406 may also authenticate policy controllers 410(A)-(C). As illustrated in FIG. 4, policy controllers 410 may be located on computing system 402. For example, policy controllers 410(A)-(C) may be integrated into client processes 404 or service processes 408 and/or may perform some or all of the functionality of policy control module 110. One or more of policy controllers 410(A)-(C) may also be located remote from computing system 402, as shown in FIG. 2.

Interprocess communication coordinator 406 may use various policy controllers 410(A)-(C) to inspect different types of interprocess communications, interprocess communications originating from different client processes 404, or interprocess communications directed toward different service processes 408. For example, policy controller 410(A) may be provided by the developer of service process 408(A), with knowledge of the structure and intent of interprocess communications expected by service process 408(A). Similarly, policy controller 410(B) may be provided by the developer of client process 404(B), with knowledge of the interprocess communications sent by client process 404(B). In another example, policy controller 410(C) may be developed to inspect interprocess communications directed toward one or more services provided by the operating system running on computing system 402, such as a messaging service on a mobile device.

In some embodiments, policy controllers 410(A)-(C) may be modules within the client or service applications that execute as client processes 404 or service processes 408. Upon installation or execution of the application, interprocess communication coordinator 406 may authenticate the client process 404 or server process 408, as well as the policy controller 410 included with the application.

As described above, the systems and methods described herein may filter interprocess communications by authenticating service processes and client processes client processes with the service processes that provide the services requested by the client processes. Services and methods described herein may allow policy controllers developed by third parties that are aware of the structure and intent of interprocess communications between specific client processes and/or service processes, and thereby may recognize interprocess communications with malicious intent, such as interprocess communications that transmit sensitive data from the computing device. Systems and methods described herein may either proxy or replace an existing interprocess communication service provided by an operating system running on the computing device.]

Figure 5:
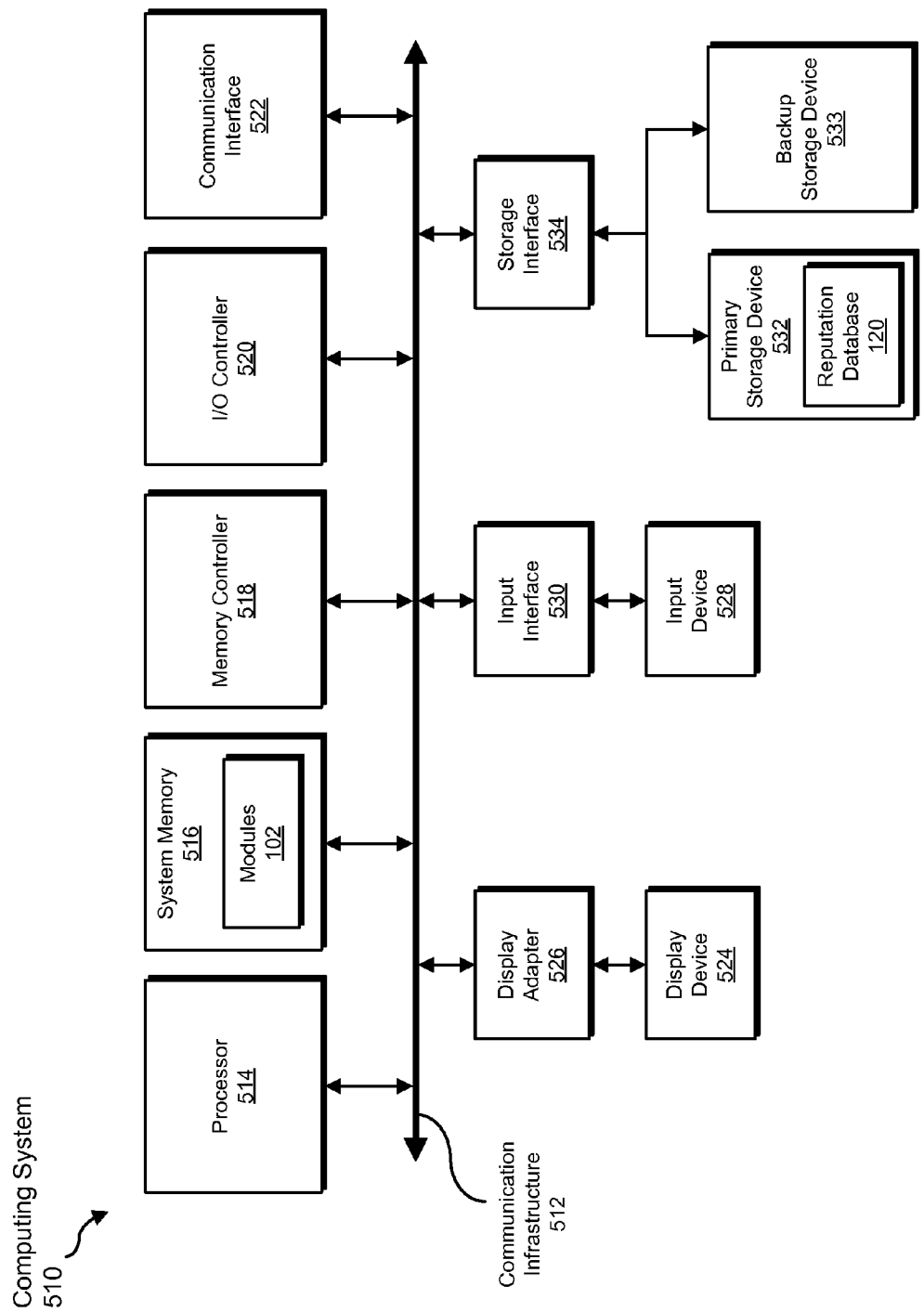
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, reputation database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
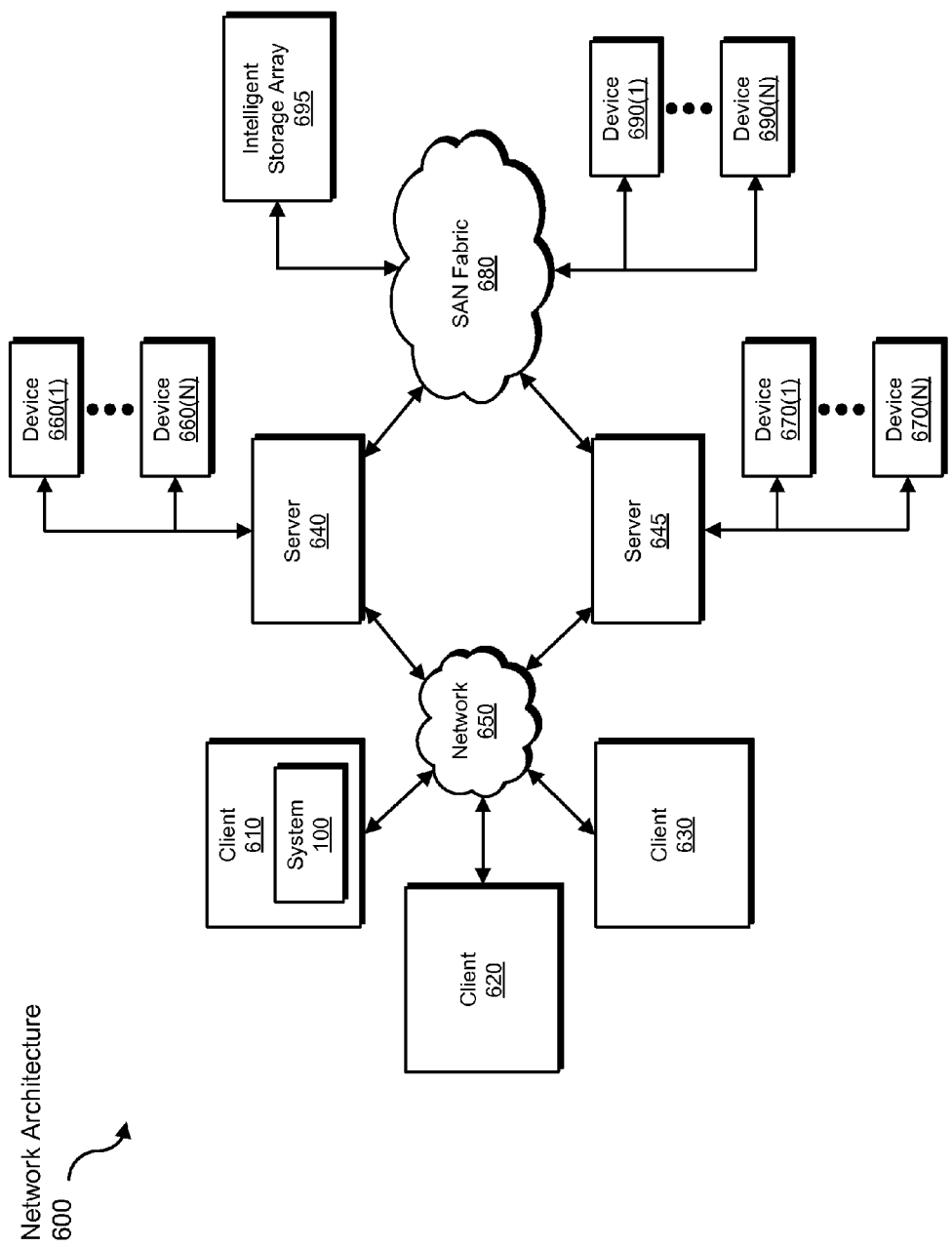
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for filtering interprocess communications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive interprocess communication service requests to be transformed, transform the interprocess communication service requests, and output a result of the transformation filtered interprocess communications. Modules described herein may also transform a physical computing system into a system for filtering interprocess communications. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for filtering interprocess communications, at least a portion of the method being performed by a computing device comprising at least one processor, the method comprising:
   identifying a service process that provides a service on the computing device;
   authenticating the service process by inspecting an assertion file to identify the service provided by the service process;
   identifying a request by a client process to use the service provided by the service process;
   authenticating the client process;
   receiving an interprocess communication from the client process directed toward the service process;
   deriving, based on authenticating the client and service processes, a context that identifies an operating environment of the client and service processes;
   determining that the interprocess communication is unexpected within the context and is therefore malicious; and
   in response to determining that the interprocess communication is malicious, blocking the interprocess communication from being communicated to the service process.

2. The computer-implemented method of claim 1, wherein receiving the interprocess communication from the client process comprises intercepting the interprocess communication from an interprocess communication service of an operating system executing on the computing device.

3. The computer-implemented method of claim 1, wherein blocking the interprocess communication from being communicated to the service process comprises preventing the interprocess communication from using an interprocess communication service of an operating system executing on the computing device.

4. The computer-implemented method of claim 1, wherein authenticating the service process comprises authenticating a digital signature included in the assertion file associated with the service process.

5. The computer-implemented method of claim 1, wherein:
   determining that the interprocess communication is unexpected within the context and is therefore malicious comprises determining that the interprocess communication is not associated with the service provided by the service process.

6. The computer-implemented method of claim 1, wherein authenticating the client process comprises authenticating a digital signature included in an assertion file associated with the client process.

7. The computer-implemented method of claim 6, wherein:
   authenticating the client process further comprises identifying at least one service used by the client process by inspecting the assertion file; and
   determining that the interprocess communication is unexpected within the context and is therefore malicious comprises determining that the interprocess communication is not associated with the service identified by the client process.

8. The computer-implemented method of claim 1, further comprising authenticating a policy controller that evaluates interprocess communications for maliciousness, wherein determining that the interprocess communication is malicious comprises:
   submitting content of the interprocess communication and/or the context of the interprocess communication to the policy controller; and
   receiving from the policy controller an indication that the interprocess communication is malicious.

9. The computer-implemented method of claim 1, wherein:
   determining that the interprocess communication is malicious comprises at least one of:
      obtaining, by querying a reputation database using information identifying a file associated with the client process, a reputation for the client process; and
      obtaining, by querying a reputation database using information identifying a file associated with the service process, a reputation for the service process; and
   determining that the interprocess communication is malicious comprises determining that the reputation of the client process and/or the reputation of the service process is negative.

10. A system for filtering interprocess communications, the system comprising:
    a service authentication module, stored in memory, that:
       identifies a service process that provides a service on a computing device; and
       authenticates the service process by inspecting an assertion file to identify the service provided by the service process;
    a client authentication module, stored in memory, that:
       identifies a request by a client process to use the service provided by the service process; and
       authenticates the client process;
    a communication module, stored in memory, that receives an interprocess communication from the client process directed toward the service process;
    a policy control module, stored in memory, that:
       derives, based on authenticating the client and service processes, a context that identifies an operating environment of the client and service processes;
       determines that the interprocess communication is unexpected within the context and is therefore malicious; and
       in response to determining that the interprocess communication is malicious, blocks the interprocess communication from being communicated to the service process; and
    at least one physical processor configured to execute the service authentication module, the client authentication module, the communication module, and the policy control module.

11. The system of claim 10, wherein the communication module receives the interprocess communication from the client process by intercepting the interprocess communication from an interprocess communication service of an operating system executing on the computing device.

12. The system of claim 10, wherein the policy control module blocks the interprocess communication from being communicated to the service process by preventing the interprocess communication from using an interprocess communication service of an operating system executing on the computing device.

13. The system of claim 10, wherein the service authentication module authenticates the service process by:
   authenticating a digital signature included in the assertion file associated with the service process.

14. The system of claim 10, wherein:
   the policy control module determines that the interprocess communication is unexpected within the context and is therefore malicious by determining that the interprocess communication is not associated with the service provided by the service process.

15. The system of claim 10, wherein the client authentication module authenticates the client process by:
   authenticating a digital signature included in an assertion file associated with the client process.

16. The system of claim 15, wherein:
   the client authentication module further authenticates the client process by identifying at least one service used by the client process by inspecting the assertion file; and
   the policy control module determines that the interprocess communication is unexpected within the context and is therefore malicious by determining that the interprocess communication is not associated with the service identified by the client process.

17. The system of claim 10, wherein the policy control module:
   authenticates a policy controller that evaluates interprocess communications for maliciousness; and
   determines that the interprocess communication is malicious by:
      submitting the interprocess communication to the policy controller; and
      receiving from the policy controller an indication that the interprocess communication is malicious.

18. A non-transitory computer-readable medium comprising one or more computer-readable instructions that, when executed by at least one processor of a computing device, cause the computing device to:
   identify a service process that provides a service on the computing device;
   authenticate the service process by inspecting an assertion file to identify the service provided by the service process;
   identify a request by a client process to use the service provided by the service process;
   authenticate the client process;
   receive an interprocess communication from the client process directed toward the service process;
   derive, based on authenticating the client and service processes, a context that identifies an operating environment of the client and service processes;
   determine that the interprocess communication is malicious; and
   in response to determining that the interprocess communication is unexpected within the context and is therefore malicious, block the interprocess communication from being communicated to the service process.

19. The non-transitory computer-readable medium of claim 18, wherein the one or more computer-readable instructions cause the computing device to receive the interprocess communication from the client process by intercepting the interprocess communication from an interprocess communication service of an operating system executing on the computing device.

20. The non-transitory computer-readable medium of claim 18, wherein the one or more computer-readable instructions cause the computing device to block the interprocess communication from being communicated to the service process by preventing the interprocess communication from using an interprocess communication service of an operating system executing on the computing device.

* * * * *